(12) United States Patent
Iwasaki

(10) Patent No.: US 7,804,517 B2
(45) Date of Patent: Sep. 28, 2010

(54) THREE-DIMENSIONAL IMAGE-CAPTURING APPARATUS

(75) Inventor: Masanori Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1524 days.

(21) Appl. No.: 11/140,210

(22) Filed: May 27, 2005

(65) Prior Publication Data

US 2005/0231590 A1 Oct. 20, 2005

Related U.S. Application Data

(63) Continuation of application No. 09/362,058, filed on Jul. 28, 1999, now abandoned.

(30) Foreign Application Priority Data

Jul. 31, 1998 (JP) .............................. P10-217033
Nov. 30, 1998 (JP) .............................. P10-338708

(51) Int. Cl.
*H04N 13/02* (2006.01)
(52) U.S. Cl. ..................................... 348/46
(58) Field of Classification Search .................. None
See application file for complete search history.

(56) References Cited

U.S. PATENT DOCUMENTS

| 4,867,570 | A | 9/1989 | Sorimachi et al. |
|---|---|---|---|
| 5,111,126 | A | 5/1992 | Powell et al. |
| 5,719,701 | A | 2/1998 | Sudo |
| 5,737,084 | A | 4/1998 | Ishihara |
| 5,835,133 | A | 11/1998 | Moreton et al. |
| 5,907,434 | A | 5/1999 | Sekine et al. |
| 6,108,090 | A | 8/2000 | Ishihara |
| 6,118,624 | A | 9/2000 | Fukuzawa et al. |
| 6,141,190 | A | 10/2000 | Nakamoto et al. |
| 6,146,776 | A | 11/2000 | Fukuzawa et al. |
| 6,176,585 | B1 | 1/2001 | Koyama et al. |
| 6,177,952 | B1 | 1/2001 | Tabata et al. |

FOREIGN PATENT DOCUMENTS

| JP | 50-23633 | 3/1975 |
|---|---|---|
| JP | 55-055831 | 4/1980 |
| JP | 58-058410 | 4/1983 |
| JP | 60-37520 | 2/1985 |
| JP | 01-279235 | 11/1989 |
| JP | 02-301740 | 12/1990 |
| JP | 08-070474 | 3/1996 |
| JP | 57-043409 | 3/1996 |

OTHER PUBLICATIONS

Japanese Office Action issued on Apr. 1, 2008 in connection with Japanese Patent Application No. 11-208972.
Japanese Office Action issued on Jun. 24, 2008.

*Primary Examiner*—Nhon T Diep
(74) *Attorney, Agent, or Firm*—Sonnenschein Nath & Rosenthal LLP

(57) ABSTRACT

A three-dimensional image-capturing apparatus includes an image-capturing device having a plurality of image-capturing regions and a plurality of optical systems for forming images of a subject in the image-capturing regions. The optical systems includes a plurality of reflectors for reflecting rays from the subject a number of times and at least a lens provided to be closer to the image-capturing device than the reflection means closest to the subject. The reflectors and the lens are used to form, in the image-capturing regions, separate images of the subject which are captured from different viewpoints.

4 Claims, 8 Drawing Sheets

TO SUBJECT

THREE-DIMENSIONAL IMAGE-CAPTURING APPARATUS

RELATED APPLICATION DATA

This application is a continuation of application Ser. No. 09/362,058 filed Jul. 28, 1999 now abandoned. The present and foregoing applications claim priority to Japanese Applications Nos. P10-217033 filed Jul. 31, 1998, and P10-338708 filed Nov. 30, 1998. Each of these applications is incorporated herein by reference to the extent permitted by law.

BACKGROUND OF THE INVENTION

1. Field of the Invention

The present invention relates to three-dimensional image-capturing apparatuses, and in particular, to a three-dimensional image-capturing apparatus that obtains a three-dimensional image (stereo-image) by capturing a plurality of images of the same subject which have parallax and that determines the distance to the subject.

2. Description of the Related Art

For forming a three-dimensional image, a plurality of images obtained by viewing the same subject from a plurality of different points, that is, images having parallax, must be captured. Accordingly, in general, a single three-dimensional image-capturing apparatus is provided with two cameras, and two images of a subject, viewed from two different positions, are captured by the two cameras.

The use of the two cameras increases the entire size of the three-dimensional image-capturing apparatus, which causes a problem in that the size cannot be reduced.

In the case where a three-dimensional image-capturing apparatus is constructed using a plurality of separate camera units, the optical axes of the camera units must be aligned. However, it is very difficult to align the optical axes of the separate camera units.

In the case where a three-dimensional image-capturing apparatus is provided with a plurality of cameras, the cameras must be externally synchronized for processing the picture signals. This inevitably requires a circuit for establishing synchronization, which causes an increase in the price of the three-dimensional image-capturing apparatus.

SUMMARY OF THE INVENTION

Accordingly, it is an object of the present invention to provide a three-dimensional image-capturing apparatus that uses a single image-capturing device to obtain a plurality of images having sufficient parallax, even though the image-capturing apparatus has a relatively simplified structure and its size is small. The image-capturing apparatus is free from damage in that imaging lenses determining most of optical characteristics and performance are exposed from the apparatus to dust, etc.

To this end, according to an aspect of the present invention, the foregoing object is achieved through provision of a three-dimensional image-capturing apparatus including an image-capturing device having a plurality of image-capturing regions, and a plurality of optical systems for forming images of a subject in the image-capturing regions, the optical systems including a plurality of reflectors for reflecting rays from the subject a number of times, and at least a lens provided to be closer to the image-capturing device than the closest reflectors to the subject among the reflectors, wherein the reflectors and the lens are used to form, in the image-capturing regions, separate images of the subject which are captured from different viewpoints having a distance therebetween.

Preferably, the three-dimensional image-capturing apparatus further includes a light-shielding unit provided at least between the image-capturing device and the reflectors so as to separate the optical systems for forming images of the subject.

The three-dimensional image-capturing apparatus may further include light-limiters provided to be closer to said subject than the reflectors for the (2n−1)-th reflection (where n represents a positive integer) from the image-capturing device along the optical systems, wherein the light-limiters prevent incidence of flux of ambient light outer from rays forming each image of the subject.

The three-dimensional image-capturing apparatus may further include a signal processor for dividing a video signal from the image-capturing device into video signals representing the images of the subject captured in the image-capturing regions for capturing images of the subject from the different viewpoints.

In the three-dimensional image-capturing apparatus, parallax which is the distance between the viewpoints may be one centimeter or greater.

The image-capturing device may be a charge-coupled-device-type solid-state image-sensing device or a metal-oxide-semiconductor-type solid-state image-sensing device.

According to another aspect of the present invention, the foregoing object is achieved through provision of a three-dimensional image-capturing apparatus including an image-capturing device, a plurality of imaging-side reflectors having reflecting surfaces provided to be obliquely outward for a plurality of different portions of the image-capturing region of the image-capturing device, a plurality of subject-side reflectors having reflecting surfaces provided, for the imaging-side reflectors, outer from the imaging-side reflectors so as to be oblique with respect to a subject, the subject-side reflectors reflecting rays from a subject to the corresponding imaging-side reflectors, a plurality of lenses or lens units provided to be closer to the image-capturing device than the subject-side reflectors in optical paths formed from the subject to the different portions of the image-capturing region of the image-capturing device so that rays from the subject are reflected by the subject-side reflectors and the reflected rays are further reflected by the imaging-side reflectors, the lenses or lens units forming a plurality of images of the subject which have parallax, and a plurality of diaphragms in which when each optical path has a lens, the diaphragms are provided to be closer to the subject than the lens and in which when each optical path has a lens unit, the diaphragms are provided to be closer to the subject than the lens unit.

The imaging-side reflectors and the subject-side reflectors may comprise mirrors, prisms, or what has a function of reflecting light.

The type of lens for imaging in each optical path may be a single lens or a set of at least two lenses.

The type of lens for imaging in the each optical path may be a spherical lens or an aspheric lens.

According to a further aspect of the present invention, the foregoing object is achieved through provision of a stereo-camera recording/reproducing system including a three-dimensional image-capturing apparatus including an image-capturing device having a plurality of image-capturing regions and a plurality of optical systems for forming images of a subject in the image-capturing regions, a single timing generator for driving the three-dimensional image-capturing apparatus so as to output the images formed in the image-capturing regions in the form of a single video signal, a single driver, a camera signal processor for implementing camera signal processing on the single video signal, a single signal recorder for recording, on a single recording medium, the processed video signal output from the camera signal processor, a single reproducer for reproducing the video signal recorded on the recording medium, a video separating circuit for separating the reproduced video signal from the reproducer into signals corresponding to the image-capturing regions, and display apparatuses for displaying the signals corresponding to the image-capturing regions, which are output from the video separating circuit, wherein the optical systems include a plurality of reflection means for reflecting rays from the subject a number of times and at least a lens provided to be closer to the image-capturing device than the reflectors closest to the subject, and wherein the reflectors and the lens are used to form, in the image-capturing regions, separate images of the subject which are captured from different viewpoints having a distance therebetween.

According to the present invention, a three-dimensional image-capturing apparatus requires a single image-capturing device. The single image-capturing device is used to obtain a plurality of captured images having a different parallax, whereby the need for establishing synchronization among a plurality of a plurality of cameras is eliminated. This further eliminates the need for providing a special circuit for establishing synchronization. By simply performing optical axis alignment for each optical system with respect to the same image-capturing device, required optical axis alignment is completed. Thus, optical axis alignment is facilitated compared with the case where optical axis alignment must be performed for a plurality of cameras. In addition, a possibility of damage in that imaging lenses determining most of optical characteristics and performance are exposed from the apparatus to dust, etc., can be eliminated.

BRIEF DESCRIPTION OF THE DRAWINGS

FIGS. 2A and 2B are illustrations of the principles of capturing two-dimensional image, in which FIG. 2A shows that when the same subject is captured from two viewpoints, two captured images of the subject are formed on different regions of an image-sensing device by optical systems and in which FIG. 2B shows the two captured images of the same subject;

DESCRIPTION OF THE PREFERRED EMBODIMENTS

Embodiments of the present invention are described below with reference to the attached drawings.

Figure 1:
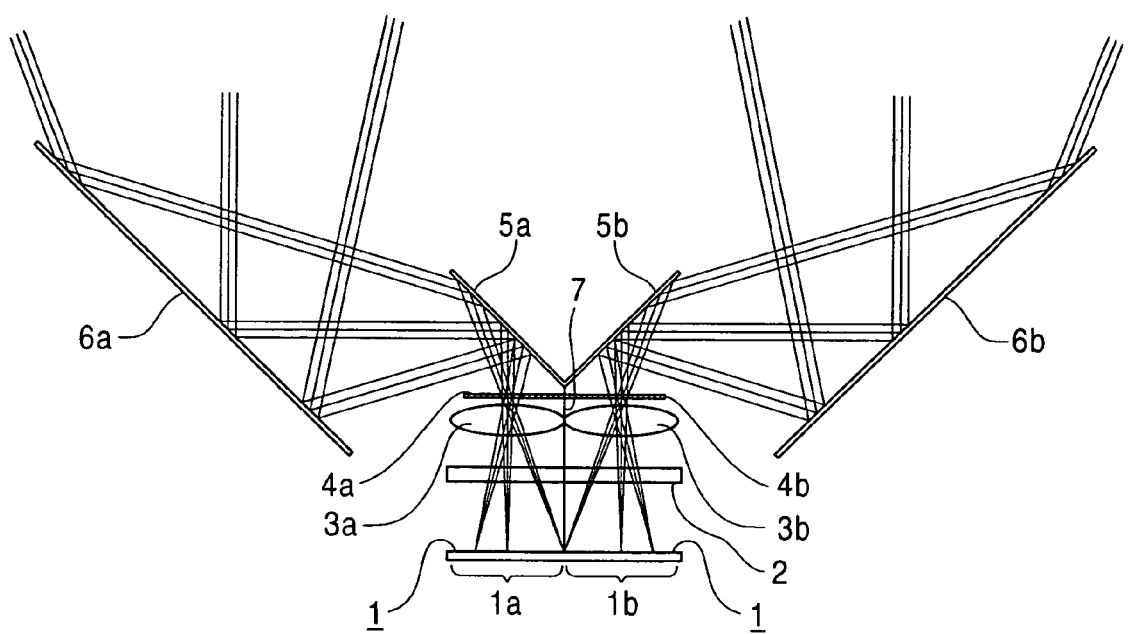
FIG. 1 is a schematic sectional view showing a three-dimensional image-capturing apparatus according to a first embodiment of the present invention.

FIG. 1 shows the structure of a three-dimensional image-capturing apparatus according to a first embodiment of the present invention. The three-dimensional image-capturing apparatus includes a solid-state image-sensing device 1, which has a half of the image sensing region of the image-sensing device 1 and the other half of the image sensing region of the image-sensing device 1, an infrared-cut filter 2 provided in front of the image-sensing device 1, imaging lenses 3a and 3b provided for the halves of the image sensing region via the infrared-cut filter 2, diaphragms 4a and 4b provided corresponding to and in front of the imaging lenses 3a and 3b, a pair of imaging-side mirrors 5a and 5b provided correspondingly to and in front of the diaphragms 4a and 4b so as to be directed in an obliquely outward direction, and a pair of subject-side mirrors 6a and 6b provided correspondingly to and outer from the imaging-side mirrors 5a and 5b, which are directed in an obliquely inward direction. An optical shield unit 7 is provided between the imaging-side mirrors 5a and 5b and the image-sensing device 1. The optical shield unit 7 prevents optical cross talk between an imaging optical system formed by the imaging-side mirror 5a, the diaphragm 4a, the lens 3a, and the half 1a of the image sensing region, and an imaging optical system formed by the imaging-side mirror 5b, the diaphragm 4b, the lens 3b, and the half 1b of the image sensing region The pair of subject-side mirrors 6a and 6b reflect rays from the same subject to the pair of imaging-side mirrors 5a and 5b at different positions (the distance between the viewpoints, that is, the parallax is preferably, approximately 1 to 15 centimeters). The pair of imaging-side mirrors 5a and 5b reflect the rays reflected by the pair of subject-side mirrors 6a and 6b to the halves 1a and 1b of the image sensing region of the image-sensing device 1. The rays reflected by the pair of subject-side mirrors 6a and 6b are controlled by the diaphragms 4a and 4b, and the controlled rays pass through the imaging lenses 3a and 3b to form images on the halves 1a and 1b of the image sensing region. The controlled rays also pass through the infrared-cut filter 2, whereby infrared radiation is cut off.

Figure 2A:
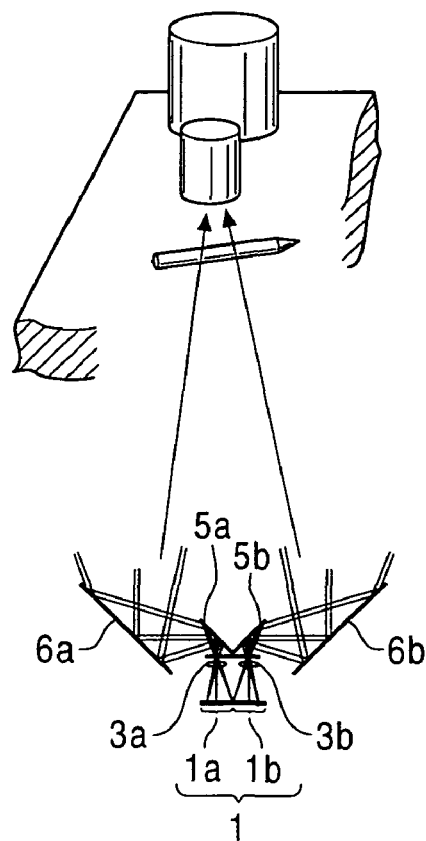
Figure 2B:
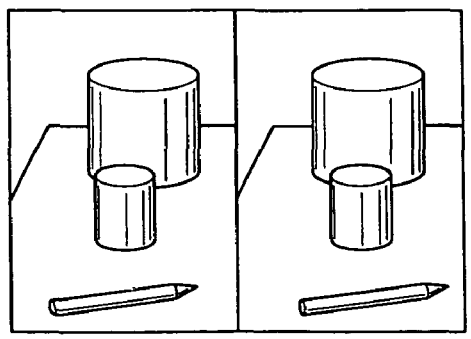

FIGS. 2A and 2B schematically illustrate the principles of capturing a three-dimensional image. FIG. 2A shows that when the same subject is captured from two different viewpoints at which the subject-side mirrors 6a and 6b are positioned, two captured images of the subject are formed on the halves 1a and 1b of the image sensing region by the imaging-side mirrors 5a and 5b, the diaphragms 4a and 4b, and the lenses 3a and 3b. FIG. 2B shows the two images captured from the different positions. From the comparison between the two captured images shown in FIG. 2B, it is found that the smaller cylinder and the pencil in front of the inmost cylinder are shifted in position. This is because the two captured images of the same subject have parallax. Accordingly, from the two captured images of the same subject which have parallax, a stereo-image of the subject can be recognized.

In other words, by appropriately processing data representing the above-described two captured images, and implementing image synthesis, three-dimensional recognition of the subject can be performed, and based on the recognition results, the image of the subject can be reproduced in the form of a three-dimensional image. Obviously, the distance from the three-dimensional image-capturing apparatus to the subject can be determined. These functions are realized because the coordinates of the portions of the subject can be obtained by using the principles of triangulation.

Figure 3A:
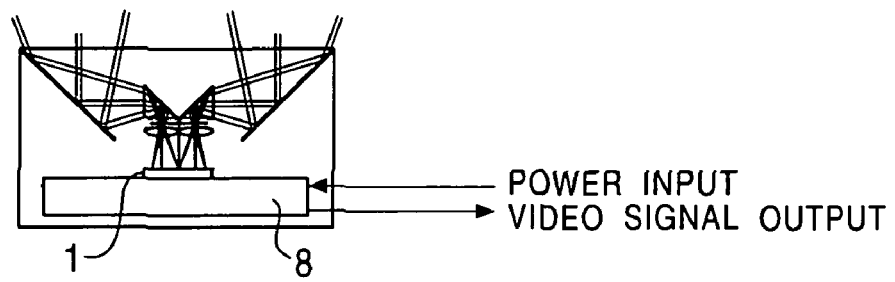
FIG. 3A is a schematic sectional view showing a three-dimensional image-capturing apparatus.
Figure 3B:
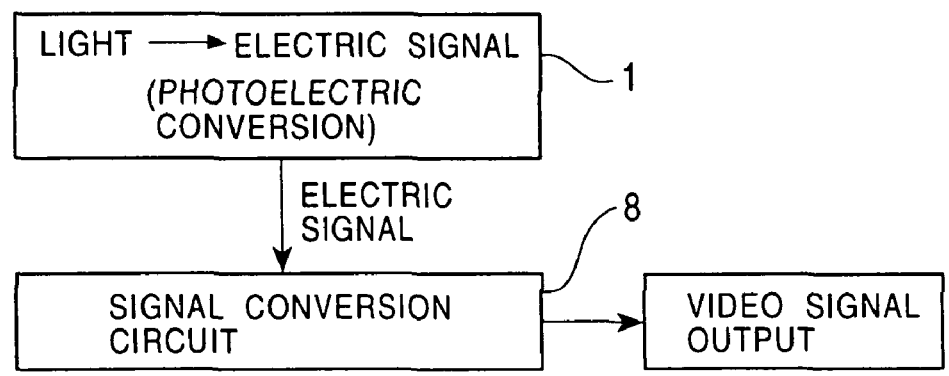
FIG. 3B is a block diagram showing an example of a circuit for processing the output of the three-dimensional image-capturing apparatus shown in FIG. 3A.

FIG. 3A shows a three-dimensional image-capturing apparatus, and FIG. 3B shows a block diagram of a circuit for processing the output of the three-dimensional image-capturing apparatus shown in FIG. 3A. Two images captured from the two viewpoints are obtained from an image-sensing device 1. A signal conversion circuit 8 converts video signals representing the images into the desired three-dimensional image data, and outputs them to the exterior. The output data are input to a display unit (not shown) that can perform stereoscopic display, and are reproduced as a three-dimensional image.

By performing direct signal processing on the three-dimensional information without separately processing the right and left images, and outputting the processed data representing positional information on the subject, the processed data may be used as image recognition data and data representing the distance from the subject.

According to the three-dimensional image-capturing apparatus according to the first embodiment, two images of one subject are captured so as to have parallax by the pairs of imaging optical systems composed of the subject-side mirrors 6a and 6b, the imaging-side mirrors 5a and 5b, the lenses 3a and 3b, the diaphragms 4a and 4b, and the different regions 1a and 1b of the image-sensing device 1. Thus, the three-dimensional image-capturing apparatus requires a single image-sensing device. Since the image-sensing device 1 can obtain two captured images having a different parallax, the two cameras do not need to be synchronized with each other, which eliminates the need for using a special circuit for synchronization.

By performing optical axis alignment for each optical system with respect to the same image-sensing device, required optical axis alignment is completed. This facilitates the optical axis alignment, compared with the conventional case where optical axis alignment for two cameras is performed.

The subject-side mirrors 6a and 6b, which are used as a pair of discrete viewpoints for obtaining two images having parallax, are provided to be outer from the imaging-side mirrors 5a and 5b. This arrangement makes it possible to increase the distance between the subject-side mirrors 6a and 6b, compared with the size of the three-dimensional image-capturing apparatus. As a result, the parallax can relatively be increased. Therefore, a very stereo-image can be obtained at a relatively high precision.

In the above-described first embodiment, the subject-side mirrors 6a and 6b, and the imaging-side mirrors 5a and 5b, are used to reflect rays from the subject twice by an angle of 90 degrees, whereby the rays impinge on the regions 1a and 1b of the image-sensing device 1. However, in order to reduce the depth size of the two optical systems in the three-dimensional image-capturing apparatus, the rays from the subject may be reflected twice by an angle (e.g., 120 degrees) greater than 90 degrees so as to be guided to the image-sensing device 1.

Figure 4:
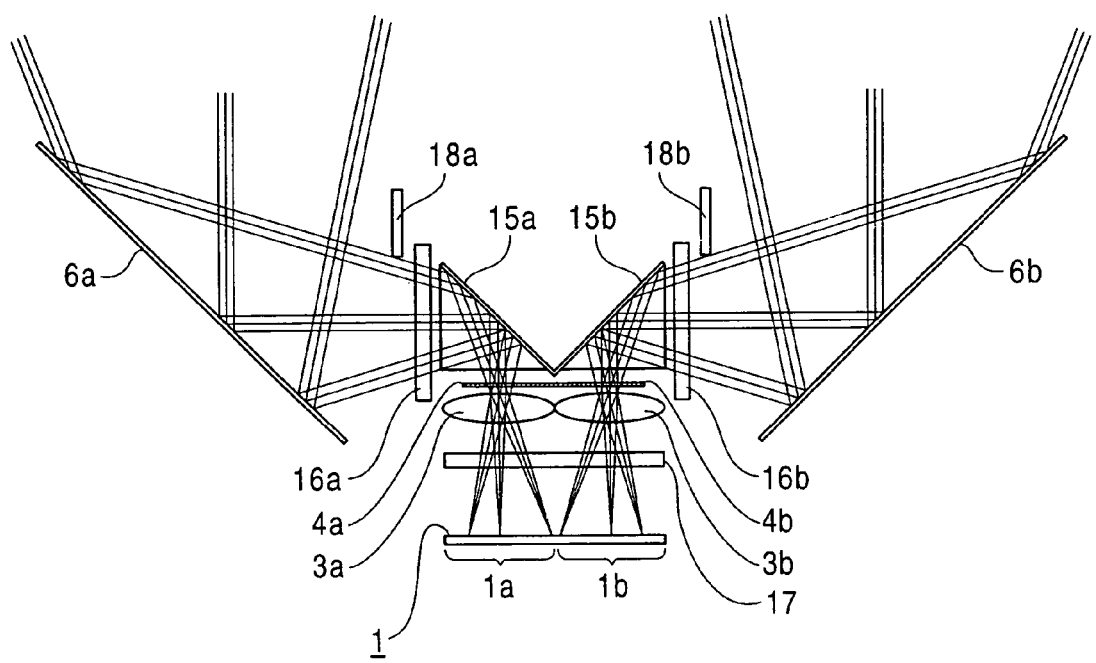
FIG. 4 is a schematic sectional view showing a three-dimensional image-capturing apparatus according to a second embodiment of the present invention.

FIG. 4 shows a three-dimensional image-capturing apparatus according to a second embodiment of the present invention. The second embodiment has components identical to those in the first embodiment. Detailed descriptions of the identical components are omitted since the identical components have already been described. Only different components are described, and in FIG. 4, the components identical to those in FIG. 1 are denoted by the identical reference numerals.

Reflecting prisms 15a and 15b constituting imaging-side reflecting units are provided in front of diaphragms 4a and 4b for the halves 1a and 1b of the image sensing region of an image-sensing device 1 so as to be directed in an obliquely outward direction. The reflecting prisms 15a and 15b function identically as the imaging-side mirrors 5a and 5b in the first embodiment-shown in FIG. 1.

Infrared-cut filters 16a and 16b are provided on the light-incident side of the reflecting prisms 15a and 15b constituting the imaging-side reflecting units. In front of an image-sensing device 1, an image-sensor cover glass 17 is provided.

Light limiters 18a and 18b function to prevent incidence of rays excluding rays to be incident on the image-sensing halves 1a and 1b of the image-sensing device 1. In other words, when rays excluding rays from imaging optical systems corresponding to the image-sensing halves 1a and 1b are incident on the image-sensing halves 1a and 1b, the incident rays are noise components, which causes image-quality deterioration. Accordingly, the light limiters 18a and 18b prevent flux of ambient light to leak.

Figure 5:
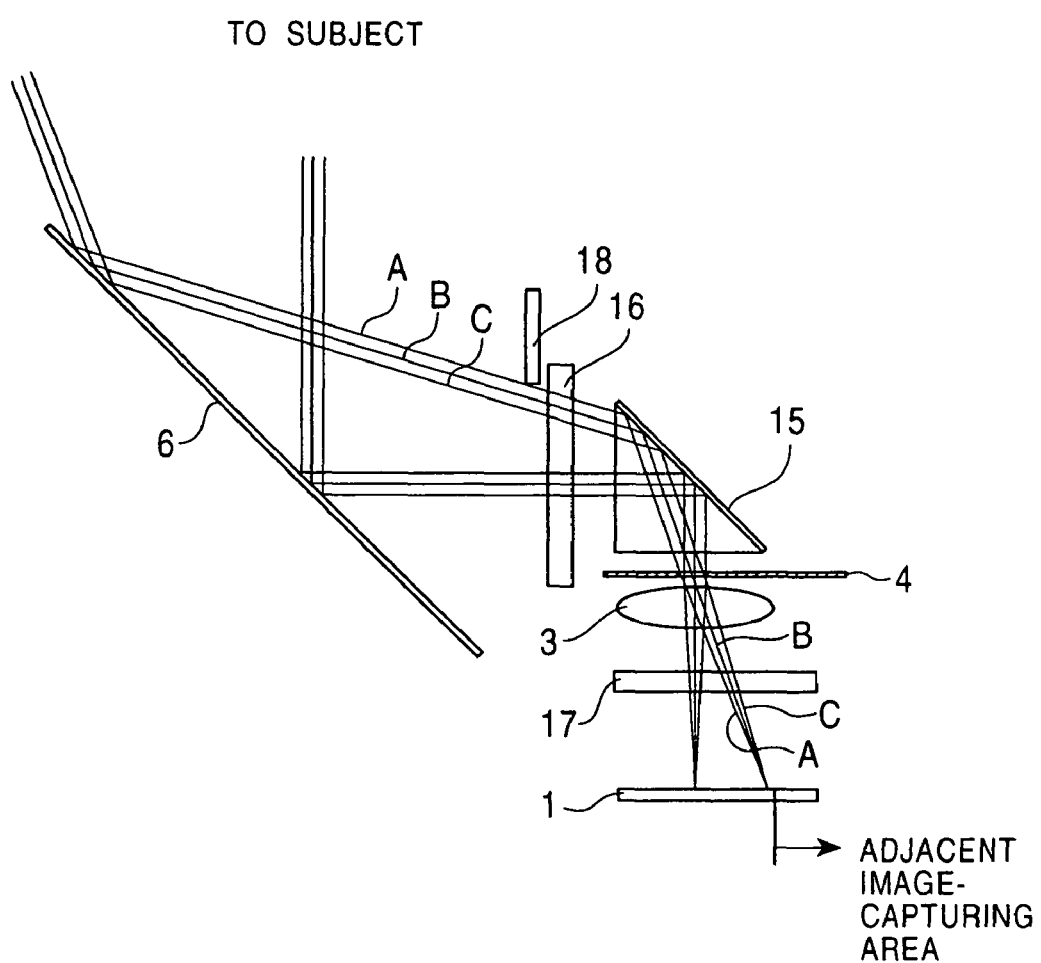
FIG. 5 is a schematic sectional view showing the principles of peripheral flux cutting by a beam limiter in the second embodiment shown in FIG. 4.

FIG. 5 shows the principles of limitation of incident rays by a light limiter 18.

The rays from the subject pass through an imaging optical system to form an image on the image-sensing region of the image-sensing device 1, and rays surrounding rays contributing to imaging may become noise components. In FIG. 5, an outermost ray A on the side of the subject is incident on the image-sensing device 1 at a greatest angle of incidence. Accordingly, rays outer from the ray A must be cut. For this purpose, the light limiter 18 may be provided for cutting rays outer from the ray A so—that the ray A passes the light limiter 18 before passing through the odd-numbered ((2n−1)-th where n represents a positive integer) reflecting unit from the image-sensing device 1, that is, the reflecting prism 15. This is because the provided light limiter 18 is positioned slightly to the central axis of the three-dimensional image-capturing apparatus so as to effectively prevent flux of ambient light to be incident. In other words, since the ray A is outside rays B and C, all fluxes of light caused by the rays A, B, and C can be allowed to contribute to imaging without cutting the rays B and C.

In the case where the light limiter 18 is provided so that the ray A passes through the light limiter 18 before passing through the odd-numbered (2n where n represents a positive integer) reflection unit from the image-sensing device 1, the flux of ambient light cannot be cut unless the light limiter 18 is provided outside the three-dimensional image-capturing apparatus. This disposition of the light limiter 18 is not preferable because the size of the three-dimensional image-capturing apparatus cannot be reduced, and light shielding can effectively be performed.

FIGS. 6A, 6B, 6C, and 6D show three-dimensional image-capturing apparatuses according to other embodiments of the present invention, respectively. Although the other embodiments have differences from the first and second embodiment shown in FIGS. 1 and 4, they have many components identical to those in the first and second embodiments, and the identical components have already been described. Accordingly, only the differences are described below.

The other embodiments shown in FIGS. 6A to 6D are different from the first embodiment shown in FIG. 1 in that two pairs of prisms 10a and 10b, and 11a and 11b, are used as reflecting units instead of mirrors. The prisms 10a and 10b constitute subject-side reflecting units, and the prisms 11a and 11b constitute imaging-side reflecting units. By using each prism as a reflecting unit, an advantage of facile positioning is obtained in that by positioning the incident or emergent surface of each prism to be parallel with or perpendicular to the image sensing region or vertical direction of an image-sensing device 1, the reflecting surface of each prism can automatically be positioned at an angle of 45 degrees with respect to a subject or the image sensing region of the image-sensing device 1.

Figure 6A:
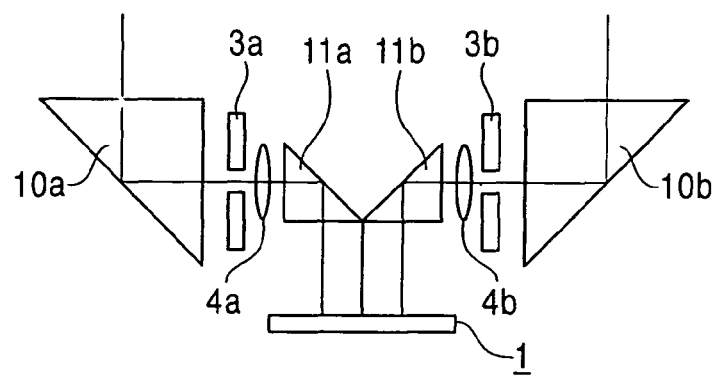
FIGS. 6A, 6B, 6C, and 6D are schematic sectional views showing three-dimensional image-capturing apparatuses according to other embodiments of the present invention.
Figure 6B:
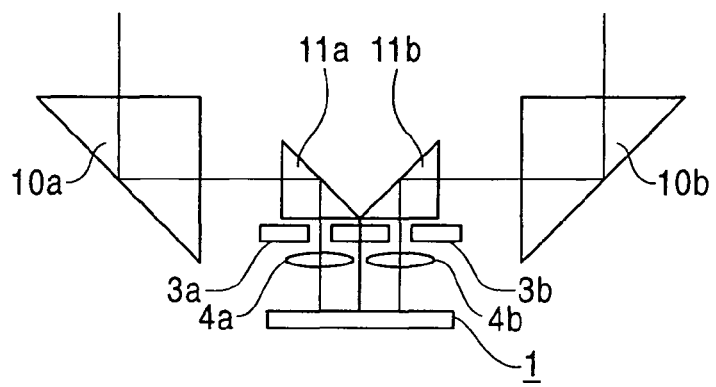

In each of the three-dimensional image-capturing apparatus shown in FIGS. 6A and 6B, the number of lenses for each optical path is one, and lenses 4a and 4b are provided on the image-sensor side of diaphragms 3a and 3b. In the embodiment shown in FIG. 6A, the diaphragms 3a and 3b and the lenses 4a and 4b are provided between the prisms 10a and 10b constituting the subject-side reflecting units and the prisms 11a and 11b constituting the imaging-side reflecting units. In the embodiment shown in FIG. 6B, the diaphragms 3a and 3b and the lenses 4a and 4b are provided between the prisms 11a and 11b constituting the imaging-side reflecting units and the image-sensing device 1.

Figure 6C:
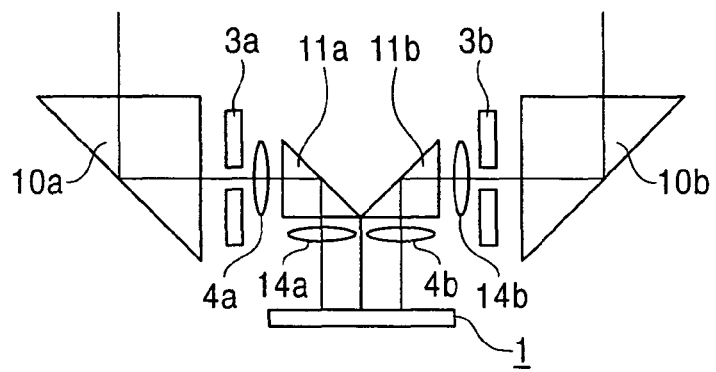
Figure 6D:
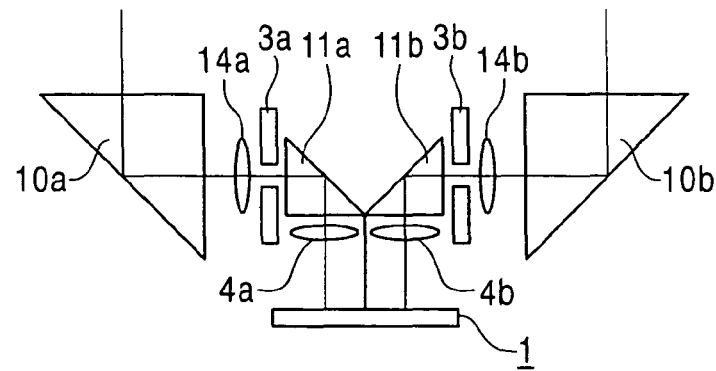

In each of the embodiments shown in FIGS. 6C and 6D, each optical path is provided with a plurality of lenses 4a, 4b, 14a, and 14b. In the embodiment shown in FIG. 6C, diaphragms 3a and 3b, and the lenses 14a and 14b provided on the imaging side of the diaphragms 3a and 3b, are provided between the prisms 10a and 10b constituting subject-side reflecting units and the prisms 11a and 11b constituting imaging-side reflecting units. The lenses 4a and 4b are provided between the prisms 11a and 11b constituting imaging-side reflecting units and the image-sensing device 1. In this arrangement, the lenses 4a, 14a, 4b, and 14b for the optical paths are positioned to be closer to the image-sensing device 1 than the diaphragms 3a and 3b. Thus, the lenses 4a, 14a, 4b, and 14b converge fluxes of light narrowed by the diaphragms 3a and 3b so as to form images. Accordingly, the size of the lenses 4a and 4b can be reduced.

In the embodiment shown in FIG. 6D, the positional relationships among the diaphragms 3a and 3b and the lenses 14a and 14b in the embodiment shown in FIG. 6C are reversed. The lenses 14a and 14b converge rays before the rays are controlled by the diaphragms 3a and 3b. However, the size of the lenses 4a and 4b can be reduced because the lenses 4a and 4b converge rays controlled by the diaphragms 3a and 3b.

In each of the embodiments shown in FIGS. 6A to 6D, an infrared-cut filter is not provided, but may be provided. Instead of the optical shield unit 7 shown in FIG. 1, the light limiters 18a and 18b in the second embodiment shown in FIG. 4 may be provided. Obviously, both the optical shield unit 7 and the light limiters 18a and 18b may be provided. Although an optical low-pass filter is not provided in the above-described embodiments excluding the second embodiment, obviously, it may be provided. If the optical low-pass filter is provided, it may be positioned at any position of each optical path. As described above, the present invention can variously be modified for practice.

An optimal mode for recording and reproduction by the above-described three-dimensional image-capturing apparatus is described below.

Figure 7:
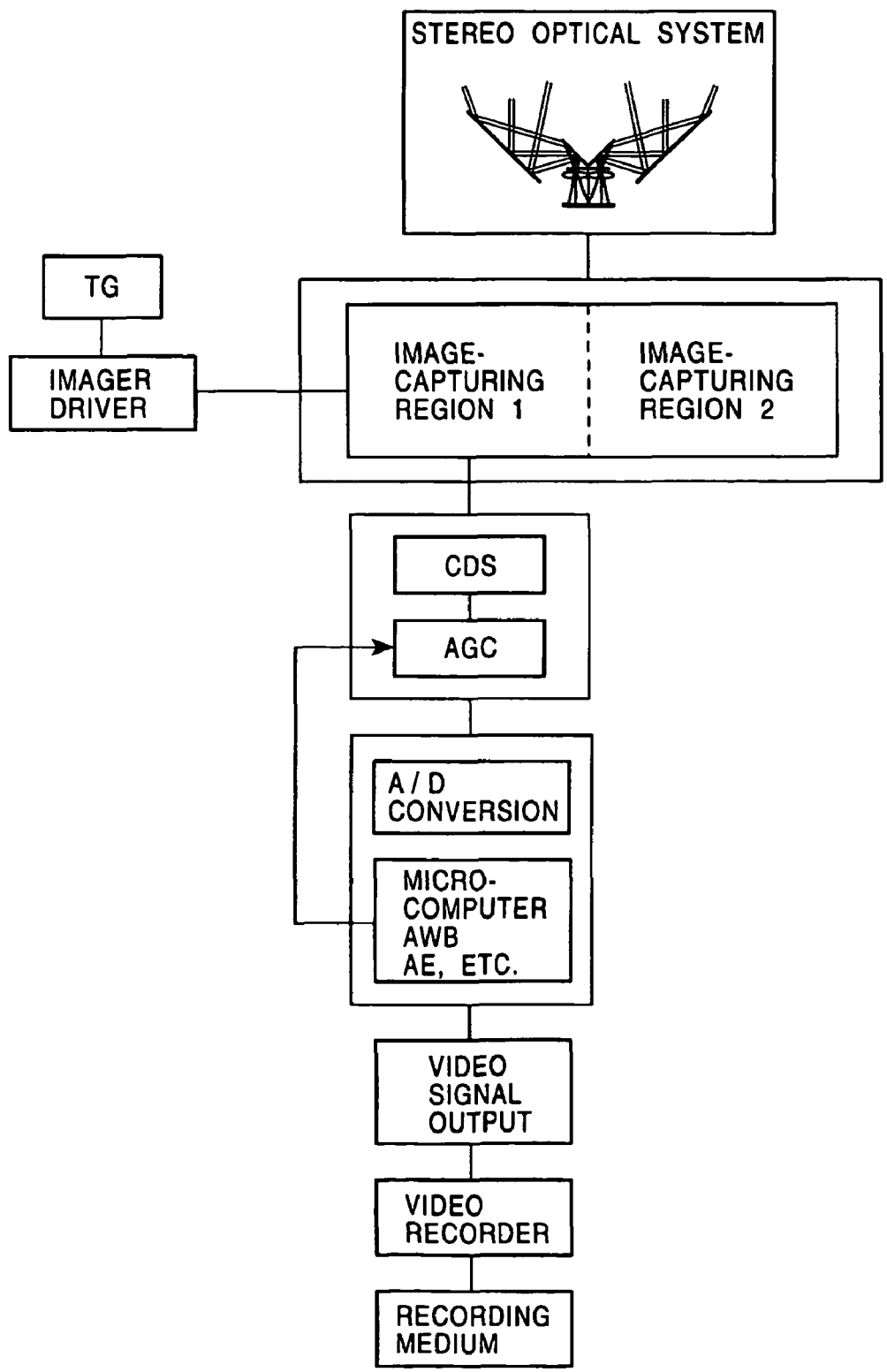
FIG. 7 is a block diagram showing a recording/reproducing system for a three-dimensional image-capturing apparatus.

Two image-capturing regions 1 and 2 of a solid-state image-sensing device as used in the above-described three-dimensional image-capturing apparatus are driven by pulses generated from a common timing generator (TG), as shown in FIG. 7. Images formed in the two image-capturing regions are photoelectrically converted into electric signals, and the electric signals are output from the image-sensing device. The electric signals are supplied to a correlative double sampling (CDS) circuit and an auto-gain control (AGC) circuit. After the electric signals are converted from analog to digital form, they are corrected by processes such as auto-white balance, and the corrected signals are fed back to the AGC circuit. As a result of the above-described camera signal processing, a video signal in which the video signals from the two image-capturing regions are simultaneously included are output from the camera system. For example, the video signal can be output as a signal in accordance with the NTSC or PAL video signal format. Thus, recording to a single recording medium by an ordinary videocassette recorder can be performed. This makes it possible to use a single recording medium to perform simultaneous recording of signals from a plurality of image-capturing regions at a full frame rate.

Figure 8:
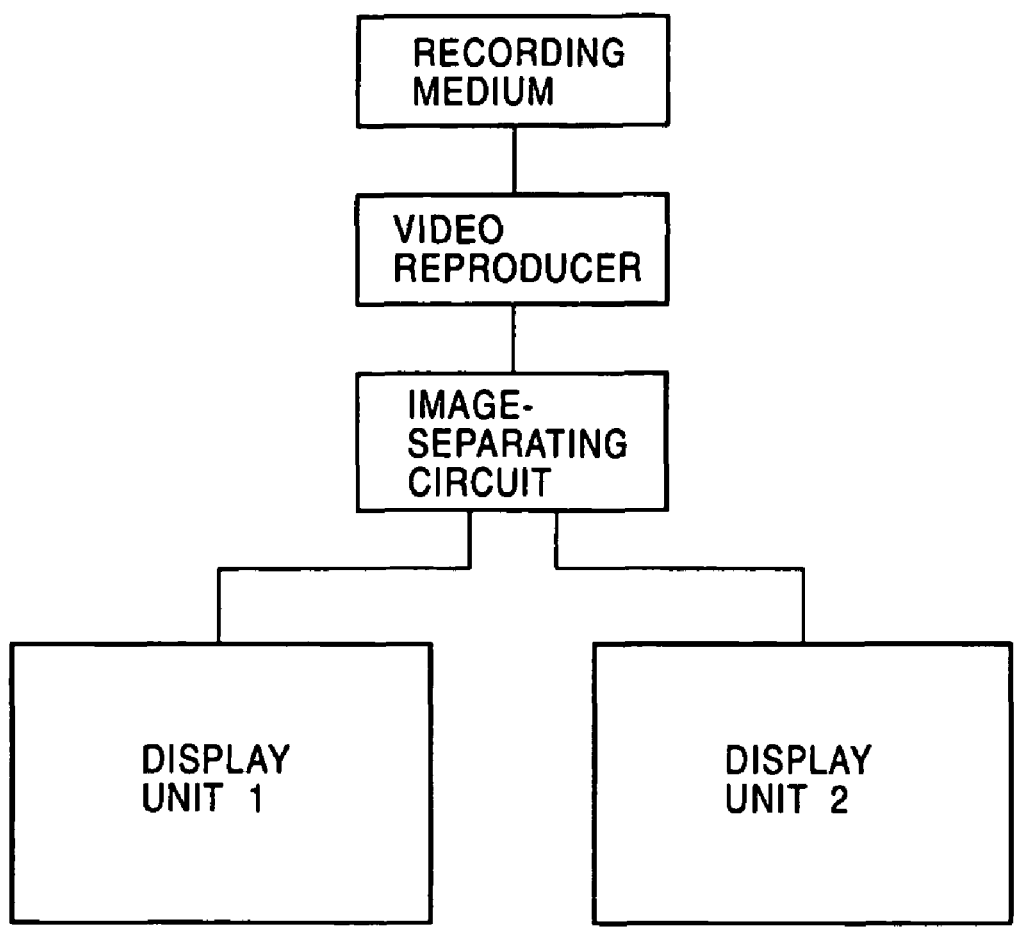
FIG. 8 is a block diagram showing a recording/reproducing system for a three-dimensional image-capturing apparatus.

The ordinary recording medium and the ordinary recording format can be used, whereby in the reproducing mode, a general video reproducer as shown in FIG. 8 is used, and simply adding an image-separating circuit to the output unit of the reproducer can separate a plurality of images. Accordingly, by simply inputting signals of the separated images from the image-capturing regions 1 and 2 into displays (display units 1 and 2) capable of stereoscopic displaying, images having parallax can easily be reproduced.

In order that a moving picture captured by a three-dimensional image-capturing apparatus may be recorded on a plurality of recording media, and that the recorded picture may be reproduced, it is important to establish synchronization among a plurality of recording apparatuses and among a plurality of reproducing apparatuses, which however complicates the apparatuses. By using the three-dimensional image-capturing recording/reproducing system shown in FIGS. 7 and 8, video signals from two image-capturing regions can simultaneously be recorded as one signal on a single recording medium, and in the reproducing mode, the recorded signal including two signal components is simply reproduced. This eliminates the need for particularly using an external synchronizing circuit for establishing synchronization among the reproducing apparatuses.

What is claimed is:

1. A three-dimensional image-capturing apparatus comprising:

a single solid-state image-sensing device having a plurality of image capturing regions;

a plurality of optical systems for forming a different image of a subject in each image-capturing region, each one of the optical systems corresponding to a different one of the image-capturing regions and each optical system having (1) an imaging-side reflection unit located in front of the corresponding image-capturing region and directed in an obliquely outward direction, (2) a subject-side reflection unit located outward from said imaging-side reflection unit and directed in an obliquely inward direction, (3) a lens provided in an optical path between said imaging-side reflection unit and said single solid-state image-sensing device, (4) a light-limiting unit provided in an optical path between the subject-side reflection unit and the imaging-side reflection unit and closer to the subject-side reflection unit than to the imaging-side reflection unit, and (5) a light-shielding unit provided normal to the single solid-state image-sensing device and extending at least between the single solid-state image-sensing device and the imaging-side reflection unit, wherein, each image capture region is configured to simultaneously capture a different image on the single solid-state image-sensing device, the light-limiting unit is effective to only exclude rays closer to the subject side reflection unit with a greatest angle of incidence on the image sensing device, the light shielding unit is effective to prevent optical cross talk between the optical systems, and the optical systems are used to form, in the corresponding image-capturing regions, separate and different images of said subject which are captured from different viewpoints having a distance therebetween.

2. A three-dimensional image-capturing apparatus according to claim 1, further comprising a signal processing unit which divides a video signal from said single solid-state image-sensing device into video signals representing the different images of said subject captured in the image-capturing regions for capturing images of said subject from the different viewpoints.

3. A three-dimensional image-capturing apparatus according to claim 1, wherein parallax which is the distance between the viewpoints is one centimeter or greater.

4. A stereo-camera recording/reproducing system comprising:

a single solid-state image-sensing device having a plurality of image capturing regions;

a plurality of optical systems for forming a different image of a subject in each image-capturing region, each one of the optical systems corresponding to a different one of the image-capturing regions and each optical system having (1) an imaging-side reflection unit located in front of the corresponding image-capturing region and directed in an obliquely outward direction, (2) a subject-side reflection unit located outward from said imaging-side reflection unit and directed in an obliquely inward direction, (3) a lens provided in an optical path between said imaging-side reflection unit and said single solid-state image-sensing device, and (4) a light-limiting unit provided in an optical path between the subject-side reflection unit and the imaging-side reflection unit and closer to the subject-side reflection unit than to the imaging-side reflection unit, and (5) a light-shielding unit provided normal to the single solid-state image-sensing device and extending at least between the single solid-state image-sensing device and the imaging-side reflection unit, wherein, each image capture region is configured to simultaneously capture a different image on the single solid-state image-sensing device, the light-limiting unit is effective to only exclude rays closer to the subject side reflection unit with a greatest angle of incidence on the image sensing device, the light shielding unit is effective to prevent optical cross talk between the optical systems, and the optical systems are used to form, in the corresponding image-capturing regions, separate and different images of said subject which are captured from different viewpoints having a distance therebetween.

* * * * *